United States Patent
Zinner (10) Patent No.: US 12,119,924 B2
(45) Date of Patent: Oct. 15, 2024

(54) METHOD FOR SECURING THE TIME SYNCHRONIZATION IN A SERVER ECU

(71) Applicant: Continental Automotive GmbH, Hannover (DE)

(72) Inventor: Helge Zinner, Hannover (DE)

(73) Assignee: Continental Automotive GmbH, Hannover (DE)

( * ) Notice: Subject to any disclaimer, the term of this patent is extended or adjusted under 35 U.S.C. 154(b) by 182 days.

(21) Appl. No.: 17/783,131

(22) PCT Filed: Dec. 17, 2020

(86) PCT No.: PCT/EP2020/086854
§ 371 (c)(1),
(2) Date: Jun. 7, 2022

(87) PCT Pub. No.: WO2021/123040
PCT Pub. Date: Jun. 24, 2021

(65) Prior Publication Data
US 2023/0019699 A1    Jan. 19, 2023

(30) Foreign Application Priority Data
Dec. 20, 2019   (DE) .......................... 102019220498.8

(51) Int. Cl.
*H04J 3/06*    (2006.01)
*H04L 12/40*   (2006.01)

(52) U.S. Cl.
CPC .......... *H04J 3/0641* (2013.01); *H04J 3/0638* (2013.01); *H04J 3/0658* (2013.01); *H04L 12/40* (2013.01)

(58) Field of Classification Search
CPC ...... H04J 3/0638; H04J 3/0641; H04J 3/0658; H04L 12/40
See application file for complete search history.

(56) References Cited

U.S. PATENT DOCUMENTS

| | | | |
|---|---|---|---|
| 7,447,931 B1 * | 11/2008 | Rischar ................. | H04J 3/0697 713/400 |
| 9,692,614 B2 | 6/2017 | Kim et al. | |

(Continued)

FOREIGN PATENT DOCUMENTS

| | | |
|---|---|---|
| DE | 102014200558 A1 | 7/2015 |
| DE | 102015209047 A1 | 6/2016 |

(Continued)

OTHER PUBLICATIONS

Japanese Notice of Reasons for Refusal for Japanese Application No. 2022-537049, dated Jul. 4, 2023 with translation, 13 pages.

(Continued)

*Primary Examiner* — Alpus Hsu
(74) *Attorney, Agent, or Firm* — Buchanan Ingersoll & Rooney PC (57) ABSTRACT

A method for securing time synchronization in a server Electronic Control Unit (ECU), including: initializing time synchronization of the components; storing a unique clock identification of a grandmaster clock; identifying a shadow controller; transmitting synchronization messages; querying the sending time with the shadow controller; inserting the time in the follow-up message via the controller that forms the grandmaster clock, and retransmitting the time; sending additional messages relating to time synchronization via selected network devices that do not provide the previously determined grandmaster clock. The time information sent in the additional messages relating to time synchronization and the clock parameters relevant for determining the best clock by Best Master Clock Algorithm (BMCA) and the domain number match those of the previously determined grandmaster clock, or are comparable with them. The additional messages relating to time synchronization contain a unique (Continued)

clock identification corresponding to the identification of the respective selected network device.

9 Claims, 4 Drawing Sheets

(56) References Cited

U.S. PATENT DOCUMENTS

| | | | |
|---|---|---|---|
| 9,973,601 B2* | 5/2018 | Spada | H04J 3/0641 |
| 10,171,227 B2* | 1/2019 | Yin | H04L 7/0008 |
| 10,320,508 B2 | 6/2019 | Shimizu et al. | |
| 10,630,720 B2 | 4/2020 | Voelker et al. | |
| 11,251,891 B2 | 2/2022 | Zinner | |
| 11,463,253 B2 | 10/2022 | Shah et al. | |
| 2014/0281037 A1 | 9/2014 | Spada et al. | |
| 2015/0236940 A1 | 8/2015 | Zinner et al. | |
| 2017/0251508 A1 | 8/2017 | Park et al. | |
| 2019/0190635 A1* | 6/2019 | Goel | H04J 3/0667 |

FOREIGN PATENT DOCUMENTS

| | | |
|---|---|---|
| DE | 102012216689 B4 | 5/2017 |
| DE | 102017219209 A1 | 5/2019 |
| JP | 2015179999 A | 10/2015 |
| JP | 2018037885 A | 3/2018 |
| JP | 2019530308 A | 10/2019 |

OTHER PUBLICATIONS

Itkin, E., et al., "A Security Analysis and Revised Security Extension for the Precision Time Protocol," Sep. 4, 2017, vol. 17(1), pp. 22-34, IEEE Transactions on Dependable and Secure Computing, IEEE Service Center, New York, XP011765146 [retrieved on Jan. 14, 2020].

International Search Report and Written Opinion for International Application No. PCT/EP2020/086854, mailed Apr. 8, 2021, with partial English translation. 11 pages.

International Search Report and Written Opinion for International Application No. PCT/EP2020/086854, mailed Apr. 8, 2021, 18 pages (German).

German Examination Report for German Application No. 10 2019 220 498.8, dated Nov. 5, 2020, with translation, 9 pages.

Office Action (Notice of Reasons for Refusal) issued Mar. 19, 2024, by the Japan Patent Office in corresponding Japanese Patent Application No. 2022-537049 and an English translation of the Office Action. (8 pages).

Office Action (Communication pursuant to Article 94(3) EPC) issued May 24, 2024, by the European Patent Office in corresponding European Patent Application No. 20 838 426.3-1206 and an English machine translation of the Office Action. (8 pages).

* cited by examiner

METHOD FOR SECURING THE TIME SYNCHRONIZATION IN A SERVER ECU

CROSS REFERENCE TO RELATED APPLICATIONS

This application is the U.S. National Phase Application of PCT International Application No. PCT/EP2020/086854, filed Dec. 17, 2020, which claims priority to German Patent Application No. 10 2019 220 498.8, filed Dec. 20, 2019, the contents of such applications being incorporated by reference herein.

FIELD OF THE INVENTION

The present invention relates to communication networks with network devices synchronized to one another.

BACKGROUND OF THE INVENTION

Ethernet technologies are increasingly being used in vehicles, where they are replacing older or proprietary data connections and data buses. On layer 3 of the OSI layer model, Ethernet connections support a large number of switching protocols for the transmission of data packets between transmitters and receivers. In the higher protocol layers, the segmentation of the data stream into packets, the process communication between communicating systems, the translation of data into a system-independent form and finally the provision of functions for applications takes place.

Almost all Ethernet communication networks used in vehicles use a protocol relating to time synchronization that provides a global network time base that is synchronous in all network devices. The prevalence of time-synchronized network devices is expected to continue to increase in the future.

The IEEE 802.1AS standard, incorporated herein by reference, provides such a protocol relating to time synchronization. Proceeding from a so-called "best clock" in the network, also referred to as a grandmaster or grandmaster clock, a master-slave clock hierarchy is set up. The grandmaster provides the time base for the network, to which all other network devices in the network are synchronized. The grandmaster is determined by means of the so-called Best Master Clock Algorithm (BMCA) and is announced within the network. To do this, IEEE 802.1AS-capable network devices send Announce messages containing information about their internal clock to other network devices that are directly connected. The information about the internal clocks provides an indication of the accuracy of the respective clock, its reference or time reference, and other properties that can be used to determine the best clock in the network. A recipient of such an Announce message compares the information received with the features of its own internal clock and any messages already received from another port with information on clocks of other network devices, and accepts a clock in another network device if it has better clock parameters. After a short time, the best clock in the network is determined, which then becomes the grandmaster in the network. Proceeding from the grandmaster, messages relating to time synchronization are broadcast over the network. A network device that receives a message relating to time synchronization does not simply forward it, but rather corrects the time information for the previously determined delay time on the connection by way of which it receives messages relating to time synchronization from a directly connected network device, and also for the internal processing time, before it retransmits the message relating to time synchronization with the corrected time information.

In the case of the clock hierarchy according to IEEE 802.1AS and the generalized precision time protocol (gPTP) defined therein, only a single network device always provides the best clock in the network. This network device therefore controls and regulates the whole time of the vehicle. All other clocks in network devices in the network are governed exclusively by this one clock. Some vehicle manufacturers even synchronize networks of other standards, for example CAN, by way of this Ethernet time master, which means that almost all network devices in the vehicle are informed of the system time by the network device that provides the grandmaster. As a result, a single network device is defined as a single point of failure in the network or the vehicle, the failure or manipulation of which device can have serious effects on the operational safety of the vehicle. As such, for example in vehicles with a high degree of driver support by appropriate systems or with systems for (semi)autonomous driving, a large volume of sensor data captured within a narrow time window must be processed together in order to derive appropriate control signals for actuators in the vehicle. The most accurate possible time recording of sensor data may also be of great importance for documentation purposes, for example when storing in log files that can be analyzed in order to reconstruct malfunctions or operating errors. The latter is of great interest in particular to insurance companies and law enforcement agencies. Safe, synchronized provision of the time information is thus essential.

Today's methods and protocols relating to time synchronization provide no easy ways of protecting the grandmaster. Each network device can easily infer which network device in the network is the grandmaster from the messages relating to time synchronization that are sent as simple multicast Ethernet frames to multiple or all network devices in the network. Protection mechanisms on higher protocol layers such as IPSEC or TLS and the like are not yet able to take effect on this level. The MAC address of the grandmaster contained in the messages relating to time synchronization makes it easy for attackers to identify and, above all, localize a network device as a particularly worthwhile attack target, on which attacks can then be concentrated.

A few approaches for detecting changes in the configuration or structure of a communication network using the time synchronization of the network are known from the prior art. An unauthorized change to the configuration of the network may, by way of example, comprise the interposition of a network device to prepare for an attack, which intercepts messages for analysis and, if necessary, retransmits altered messages. This can be used to prevent or at least disrupt safe and proper operation.

DE 10 2014 200 558 A1, incorporated herein by reference, describes secure network access protection by way of authenticated timing. It describes how the timing is meant to be secured using authentication protocols. Either a delay time is determined and/or an additional protocol is used to validate the integrity of the time synchronization messages. However, the application cannot detect if parameters change and whether the quality of the clock parameters is actually right.

DE 10 2012 216 689 B4, incorporated herein by reference, describes a method for monitoring an Ethernet-based communication network in a motor vehicle by monitoring the communication connection between two network nodes connected via the communication network, and an accordingly configured network node. There is provision in this case for the delay time of the signals between network nodes of the communication network to be measured bidirectionally and cyclically and for changes in the signal delay time to be evaluated. Furthermore, in order to detect attacks of this type, this application proposes monitoring delay times of messages relating to time synchronization within the communication network. An additional network device connected between two network devices that intercepts and forwards messages will inevitably change the delay time of the messages, even if the forwarded message is not altered.

In DE 10 2017 219 209 A1, incorporated herein by reference, time synchronization messages are checked for their plausibility. The document discloses a method for detecting an incorrect timestamp of an Ethernet message, in which the steps of receiving an Ethernet message containing a timestamp by way of a control unit of a motor vehicle; determining a time difference between a global time of the timestamp and a local time of a clock of the control unit; and detecting the timestamp of the Ethernet message as incorrect are performed. The global time of the timestamp is replaced by the local time of the clock of the control unit if the timestamp is detected as incorrect.

Approaches are also known for using the time synchronization protocol to detect when new control devices are planted in the vehicle electrical system as eavesdroppers. However, it is not possible to detect if an attack/error occurs on a known control unit.

DE 10 2015 209 047 A1, incorporated herein by reference, discloses a method for providing time synchronization hi a node connected to an Audio Video Bridging (AVB) Ethernet communication network. It includes steps for receiving static notification messages from neighboring nodes and forming a static grandmaster table, reselecting a grandmaster with reference to the static grandmaster table when a synchronization message tinier expires, and updating the static grandmaster table according to a reselection of the grandmaster. The method can quickly schedule synchronization in the Audio Video Bridging (AVB) Ethernet communication network and minimize network load.

The best clock, the so-called grandmaster, represents a single point of failure. If this one control unit or this one controller or the implementation is attacked, then an attacker is able to manipulate the whole time in the vehicle. This affects the performance of actions, the fusioning of sensor data and the storage of logging data, for example, which can lead to devastating effects from system failure through to accidents. Synchronization messages are sent by multicast and can therefore be received by many, probably all, subscribers. This represents a very serious threat in view of the automated method and the safety requirements of ISO26262, which is incorporated herein by reference.

Up to now, however, none of the known applications has dealt with the problem of how the grandmaster can be protected from attacks using simple means without losing basic compliance with the IEEE 802.1AS standard.

The Ethernet-based time synchronization represents a single point of failure in the vehicle, since firstly there is only one time master and secondly the exact location of the grandmaster can be identified at any point in the network.

SUMMARY OF THE INVENTION

Therefore an aspect of the invention is directed to a method and a network device implementing the method that secure the time synchronization in the vehicle electrical system.

The method for securing the time synchronization in a server ECU, in which a time synchronization takes place according to a time synchronization standard, comprises initializing the time synchronization of the components of the server ECU, storing a unique clock identification of a grandmaster clock determined during the initialization in each of the components of the server ECU that does not provide the previously determined grandmaster clock, identifying a shadow controller selected from the components of the server ECU; transmitting the synchronization messages, querying the sending time with the shadow controller, inserting the time in the follow-up message by way of the controller that forms the grandmaster clock, and retransmitting the time, sending (206) additional messages relating to time synchronization by way of selected network devices that do not provide the previously determined grandmaster clock, wherein the time information sent in the additional messages relating to time synchronization and also the clock parameters relevant for determining the best clock by means of BMCA and the domain number match those of the previously determined grandmaster clock, or are comparable with them, and wherein the additional messages relating to time synchronization contain a unique clock identification corresponding to the identification of the respective selected network device.

It is particularly advantageous if the initialization of the time synchronization is carried out in a safe environment in which an attack can be ruled out with sufficiently high probability, for example at the end of a production process by way of which a product containing the secure network is manufactured. One-off initialization may suffice, above all, if the network, or the configuration thereof, does not change again after the initialization, for example in vehicles of all kinds.

The method according to an aspect of the invention also comprises sending additional messages relating to time synchronization by way of selected network devices that do not provide the previously determined grandmaster clock, wherein the time information sent in the additional messages relating to time synchronization and also the clock parameters relevant for determining the best clock by means of BMCA and the domain number match those of the previously determined grandmaster clock, or are comparable with them. However, the additional messages relating to time synchronization contain a unique clock identification corresponding to the identification of the respective selected network device. The clock parameters relevant for performing the BMCA comprise in particular the values for the variables priority1, priority2, clockClass, clockAccuracy, offsetScaledLogVariance and timeSource according to the IEEE 802.1AS standard. To anyone listening in on the network traffic, each of the additional messages relating to time synchronization that are sent by the selected network devices thus appears to come from a grandmaster clock, as do the messages relating to time synchronization from the grandmaster clock determined during the initialization, which means that the observer sees a multiplicity of grandmaster clocks existing in the network.

The selected network devices preferably send their additional messages relating to time synchronization in cycles that correspond to those of the grandmaster clock determined during the initialization. Each of the selected network devices thus represents a kind of pseudo-grandmaster clock that behaves as if it were the only and also the best clock in the network. For an outside observer, the pseudo-grandmaster clock cannot be distinguished from the grandmaster clock determined during the initialization, despite the fact that the time synchronization trees differ in respect of the dissemination of the messages relating to time synchronization within the network, since the additional messages relating to time synchronization are sent with the same domain number.

The selected network devices can start sending the additional messages relating to time synchronization as soon as the unique clock identification of the grandmaster clock determined during the initialization has been sent to all network devices. However, it is also possible to start sending the additional messages relating to time synchronization only when a first time synchronization of all network devices in the network has been completed.

Each of the additional messages relating to time synchronization is forwarded in compliance with the standard by all network devices in the same manner as the messages relating to time synchronization that are sent by the grandmaster clock determined during the initialization. This means that after the time information has been corrected for the delay time on the receive link and the internal processing time, a message relating to time synchronization is sent to other directly connected network devices.

The network devices are connected to one another by way of physical interfaces. Messages relating to time synchronization are sent via a logical port defined for the interface, which means that there are point-to-point connections for the time synchronization between two network devices even when physical transmission media are shared. In the present description, the term interface is used synonymously with the term port, unless the context reveals otherwise.

The method according to an aspect of the invention makes identifying the grandmaster clock determined during the initialization considerably more difficult or even impossible for an observer who begins to listen in on the network traffic only after the initialization has been completed.

The selection of the network devices that send their own messages relating to time synchronization in addition to the grandmaster clock, and thereby masquerade as the grandmaster clock, may comprise a check to determine whether a network device is essential to the operation of the network or of a system containing the network, and therefore should not be used as a decoy for a possible attack. Essential network devices are, for example, those that connect multiple network segments to one another, such as e.g. a switch, a bridge, or on which functions are implemented that cannot be undertaken by other network devices, such as e.g. a domain computer for automated or autonomous driving or other safety-related functions. Such network devices are preferably not selected. The selection may also involve checking whether a network device is configured to execute generic functions or software that can also be executed by another network device within the network and can accordingly be relocated to one of these other network devices if necessary, for example if an attack on a network device is detected. Such network devices can preferably be selected to send their own messages relating to time synchronization, as can network devices that are situated at the edge of the network and/or provide non-safety-related functions and whose isolation from the rest of the network would not lead to major malfunctions in the event of a detected attack. The same applies to network devices to which only a few other network devices are connected, for example network devices having only one port and accordingly only one neighbor, and that can therefore be isolated more easily. The selection of network devices to send their own messages relating to time synchronization can also preferably involve network devices that are provided with particularly strong safety mechanisms and are therefore better able to withstand attacks. In a simple case, the selection of network devices to send their own messages relating to time synchronization may comprise reading a flag that was set when the network device was manufactured or configured for operation in the network. Other features for determining whether a network device can be configured to send additional messages relating to time synchronization can be determined by appropriate functional queries.

In network devices that do not provide the grandmaster clock determined during the initialization, the method according to an aspect of the invention also comprises receiving messages relating to time synchronization on a first network interface and a check to determine whether the clock identification transmitted in the message relating to time synchronization matches the stored clock identification of the grandmaster clock determined during the initialization. If the clock identifications match, a local clock is synchronized using the time information received in the message relating to time synchronization.

A further development of the method according to an aspect of the invention comprises monitoring the time information transmitted in additional messages relating to time synchronization for a difference in relation to time information transmitted in messages relating to time synchronization containing the clock identification of the grandmaster clock determined during the initialization. As long as a network device is synchronized with the grandmaster clock determined during the initialization, the time information on which the comparison is based can also be provided by the clock of the network device. If a difference in the time information has been detected, additional messages relating to time synchronization containing the associated clock identification for which a difference has been detected can be blocked, i.e. not forwarded to the network. Should the difference be the result of an attack on the network device, an attacker who is monitoring the network only at one point will not notice the blocking because messages relating to time synchronization are not acknowledged by a recipient. Alternatively, the differing time information transmitted in the received additional message relating to time synchronization can be corrected and forwarded on the basis of time information received from the grandmaster clock determined during the initialization. The basis for the time correction may also be the local clock synchronized with the grandmaster clock determined during the initialization. Alternatively or additionally, a corresponding message may be sent to a previously defined network device of the network that is configured to initiate and/or control suitable protective measures. Suitable protective measures may comprise, by way of example, isolating that network device or individual streams or messages from that network device that is sending the differing time information from the rest of the network, or restarting the network device in question.

One embodiment of the method according to the invention comprises the sporadic or cyclic sending, by the grandmaster clock determined during the initialization, of messages relating to time synchronization in which the time information differs from the actual time, and the monitoring of the additional messages relating to time synchronization that are sent by the other network devices for whether they reflect the differing time information accordingly. If this is not the case—inevitable tolerances during the synchronization can be ignored—there may be a malfunction or an attack, and the network device that provides the grandmaster clock determined during the initialization can send a corresponding message to a previously defined network device of the network that is configured to initiate and/or to control suitable protective measures, for example to isolate the network device that does not reflect the changes in the differing time information from the rest of the network. If the additional messages relating to time synchronization that are sent by the other network devices reflect the changed time information, it can be assumed that all pseudo-grandmaster clocks are behaving in accordance with the rules.

A computer program product according to an aspect of the invention contains instructions that, when executed by a computer, cause said computer to perform one or more embodiments and further developments of the method described above.

The controller that has implemented the time master functionality needs to attend to specific interrupts and also reserve resources therefor. As a result of the disclosure of the invention, however, almost any controller may be used, which in turn reduces system costs and resources.

The effect provided by the method, namely protection against unauthorized attack on the time synchronization, distortion of the communication, and against the exchange of devices, can also be achieved in other ways and with an even higher safety level, for example by using hardware encryption (or authentication). The method allows protective mechanisms to be provided more cheaply (useful for meeting ISO26262 requirements) and also reduces system costs. The method could even be imported later via OTA.

By contrast, in vehicles, it is generally not economical to buy hardware equipment sufficient for seamlessly encrypted communication for all subscribers connected to the network. The method described requires significantly fewer hardware resources (can be put into action using existing implementations) and thus significantly increases the safety level without this necessarily being linked to higher production costs for the network or devices connected thereto.

This method may be implemented in particular in the form of software that can be distributed as an update or upgrade for existing software or firmware of subscribers in the network and in this respect is an independent product.

The quality of the execution of software-based applications (e.g. automated driving) can advantageously be increased by an aspect of the invention, in particular without additional financial outlay. With the use of the newly introduced Ethernet protocol in automobiles, there is a need for mechanisms that make use of simple techniques and given properties of technologies in order to be able to do without expensive implementations and other additional hardware. The network system according to an aspect of the invention is improved in terms of cost and reliability.

Advantageously, the safety of a vehicle network can be increased significantly and very simply by an aspect of the invention, in particular without additional financial outlay. With the use of the newly introduced Ethernet protocol in automobiles, there is a need for mechanisms that make use of simple techniques and given properties of technologies in order to be able to do without expensive implementations and other additional hardware. Earlier detection of attacks and abnormal behavior by means of early analysis of the communication paths allows gaps and errors to be identified before the vehicle is delivered. The network system according to an aspect of the invention is improved in terms of cost and reliability. The testability of the system is defined more clearly by an aspect of the invention and this allows test costs to be saved. In addition, an aspect of the invention affords transparent safety functionality.

Today, applications are for the most part implemented, tailored and adapted to just one vehicle type or model. This presented method allows the software to be designed more flexibly and value added services to be generated from the underlying system without having permanently programmed it into the software beforehand. Today we actually have to assume the worst case, which costs resources (money) and loses quality. An aspect of the invention allows software developers and software architects to provide software/applications that can be tailored to the requirements of the application more flexibly and precisely. Incorporating the cited methods into software allows optimization to take place within the control unit. This means that the software can be designed to be more independent of platform and vehicle type.

The new technologies can no longer be held back in automobiles. Protocols such as IP, AVB and TSN have thousands of pages of specifications and test suites. It is not an immediate given that these new protocols are controllable in automobiles.

The new method can be integrated into an existing network without damaging existing devices. The standard is not violated since the existing protocol can be used.

Use of the method would also be possible for other communication systems with clock synchronization components and embedded systems.

The computer program product may be stored on a computer-readable medium or data carrier. The data carrier may be in a physical embodiment, for example as a hard disk, CD, DVD, flash memory or the like; however, the data carrier, or the medium, may also comprise a modulated electrical, electromagnetic or optical signal that can be received by a computer by means of an appropriate receiver and can be stored in the memory of the computer.

A network device at least according to an aspect of the invention comprises at least one physical communication interface in addition to a microprocessor and nonvolatile and volatile memory and also a timer. The components of the network device are communicatively connected to one another by means of one or more data lines or data buses. The memory of the network device contains computer program instructions that, when executed by the microprocessor, configure the network device to implement one or more embodiments of the method described above.

An aspect of the present invention protects the grandmaster by disguising or hiding the trace thereof, which was previously easy to find, by way of a multiplicity of false traces, making it more difficult for attackers to determine the position of the grandmaster within the network. The attacker is then no longer able to attack at all, or at least needs considerably more time. Attacks that do not coincidentally immediately affect the grandmaster can be detected and suitable defense measures can be taken while the system still remains synchronized with the required accuracy.

The method according to an aspect of the invention can be put into action using existing network devices, wherein if necessary only adjustments in the software or in the state machines used for receiving and processing messages relating to time synchronization are required in order to use only the messages relating to time synchronization that come from the grandmaster clock determined during the initialization to synchronize the clocks, but still to forward the additional messages relating to time synchronization and not simply delete them. As a result, there are only minor additional costs, if any, for putting it into action. Existing systems can also be configured to put the method into action by using appropriately modified software. Another advantage of the method according to an aspect of the invention is that the particular underlying hardware platform is irrelevant as long as it supports synchronization according to the IEEE 802.1AS standard.

BRIEF DESCRIPTION OF THE DRAWING

The invention will be explained below by way of example with reference to the drawing. In the drawing.

Identical or similar elements may be referenced with the same reference signs in the figures.

DETAILED DESCRIPTION OF EXEMPLARY EMBODIMENTS

Figure 1:
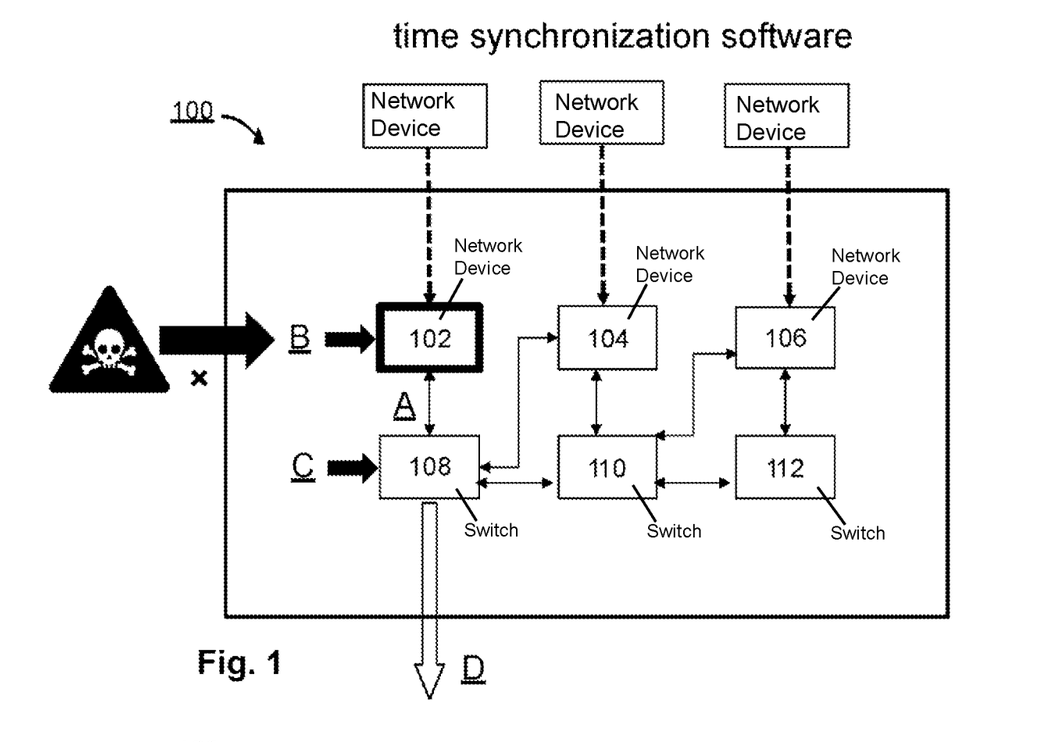
FIG. 1 shows an illustrative block diagram of a network synchronized according to a time synchronization standard.

FIG. 1 shows an illustrative block diagram of a server ECU 100 synchronized according to a time synchronization standard having multiple network devices 102, 104, 106 time-synchronized with a first grandmaster clock, and the switches 108, 110 and 112. In this case, the controller 102 and the switch 108, the controller 102 and the switch 104, the controller 104 and the switch 110, the controller 104 and the switch 106, and the controller 106 and the switch 112 are in each case connected to one another by way of bidirectional communication connections. Access is either via Ethernet or another bus such as MDIO or SPI. Controllers 102, 104 and 106 are also connected to other network devices, not shown in the figure, by way of bidirectional communication connections. Each component of the server ECUs 102-112 has a timer that can be synchronized according to a time synchronization standard. After carrying out the approach agreed in the standard, controller 102 has been determined as the grandmaster clock for the whole system, i.e. messages relating to time synchronization are sent to the network from controller 102. In this case, controller 102 sends messages relating to time synchronization, e.g. to the controller 106 connected to it, and also to another network device, which is not shown in the figure. The direction in which the messages relating to time synchronization are sent is indicated in each case by the white-filled arrows shown next to the communication connections. Switch 108 corrects the time information received from the controller 108 for the previously determined delay time on the communication connection to controller 102 and the time required in the switch 108 for correction and forwarding, and retransmits an accordingly modified message relating to time synchronization to another network device, which is not shown in the figure. In addition to the corrected time information, the messages relating to time synchronization also contain information about the grandmaster clock of the system, in this case controller 102. Controller 104 proceeds accordingly and once again sends messages relating to time synchronization that have been corrected for applicable delay times to switches 110 and 102, and also to another network device, which is not shown in the figure. Accordingly again, network device 102 sends corrected time information to the switch 108. Owing to the respective correction of the time information prior to forwarding, all of the timers in the network devices are synchronized to the time of the grandmaster clock, excluding any remaining residual inaccuracies on account of individual differences in the corrections of the time information prior to the respective forwarding. The grandmaster clock cyclically sends messages relating to time synchronization to the network, these then being redistributed as described above.

The X shown in FIG. 1 represents an attacker who wants to find out which network device is providing the grandmaster clock by listening in on the network traffic. The listening is indicated by the arrow pointing from the triangle with a skull and crossbones. Since each message relating to time synchronization contains the clock identification and also the respective MAC address of the sender and the receiver, it is easy for the attacker to identify network device 102 as the grandmaster clock in the network and to select it as a target for attack. The arrow indicating the listening is intended to be understood only as an example—listening in and attacking can take place at any point in the network.

In the method, the disclosure of an aspect of the invention proposes concealing the grandmaster 102 from FIG. 1 from attackers, or making it invisible to them. The disclosure of an aspect of the invention proposes that the timestamping is unreservedly, and this is what matters, robust, or originates from the same node and is not produced by the controller, or the controller software, whose sender address is used.

FIG. 1 shows a way of solving the problem described above. A server ECU 100 in which multiple controllers 102, 104, 106 and multiple Ethernet switches 108, 110, 112 are integrated is illustrated. Individual time synchronization software, such as e.g. PTP, gPTP or 802.1AS, runs on each of these controllers. One of these controllers is the grandmaster 102. Although said grandmaster sends time synchronization messages A containing its sender address, it obtains the actual timestamps, or the reference time, from a switch module 108. The time synchronization messages D, which are transmitted externally via the network to sensors, other control devices, always include the ID (MAC address or IP address) from the controller 102, but get the timestamp from the switch (which needs to be protected).

Figure 8:
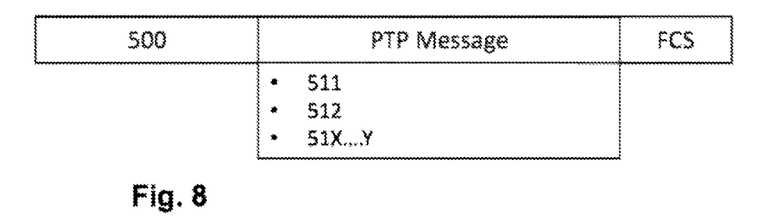
FIG. 8 shows the address of the grandmaster that is contained in the synchronization messages.

Since the time synchronization messages D are sent by multicast, they can also be received and interpreted fairly easily by an alien or manipulated ECU/SW 102, 104, 106. The address of the grandmaster is in the message, as indicated in FIG. 8.

If this controller 102 is now attacked, the actual best clock 102 is not attacked, which the attacker X does not know. The controller 102, 104, 106, or the executing time synchronization software, can now be changed relatively easily and the synchronization can be continued seamlessly using the same basis, i.e. the same switch 108, 110, 112. There will therefore be no jump in the time. An entire control unit cannot per se be attacked directly at network level, since it consists of many units.

The method 200 may either always be active or have been triggered by a specific use case. The motivation for this may be changing to a higher level of automation, safety level, if there is online access, or if there is the suspicion of an ongoing attack.

A controller from which the actual time is to be fetched is now determined. This may be a switch 108, 110, 112 or another controller 102, 104, 106, to which there is ideally a direct connection. Access is either via Ethernet or another bus such as MDIO or SPI.

The time synchronization software in the controller 102 is now started. To this end, synchronization messages are transmitted to the shadow controller 108, the switch from which the timestamp is obtained, in the form of a sync message. The transmission of this message D by the "shadow controller" switch 108 results in a hardware timestamp being written at the output, e.g. to a register, and the message being sent without modification. The sender address of the controller 102 and not of the switch 108 is used in this case.

The controller 102 then queries this register of the respective port with this shadow controller 108 by hardware line, or Ethernet or SPI, and takes this time in order to insert it into a newly generated follow-up message. Said message is then sent to the shadow controller 108 (for every port) and transmitted unchanged.

Even if the actual controller 102 has now generated the messages in software and has assembled the frames, they do not originate from said controller. The synchronization of the vehicle electrical system can be performed with constant accuracy.

Figure 2:
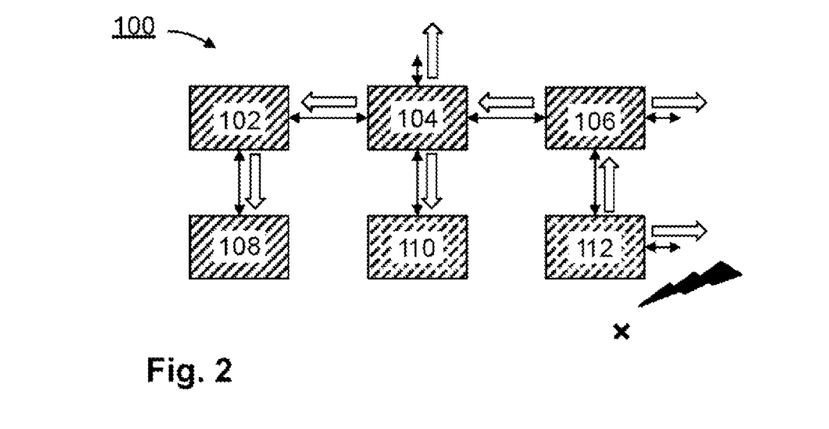
FIG. 2 shows the block diagram of the network from FIG. 1 during an attack.

FIG. 2 shows the block diagram of the server ECU 100 from FIG. 1 during an attack at a different point. After identifying the controller 106 as the grandmaster clock, the attacker can attempt to manipulate the timer itself or the message relating to time synchronization that is sent by the controller 106. On account of the synchronization, all network devices would take on the manipulated time information, and after a short time all controllers of the server ECU would be synchronized to an incorrect time, indicated by the shading of the boxes that represent the controllers. In the event of such an attack, there is provision for another switch to be used for time information.

Figure 3:
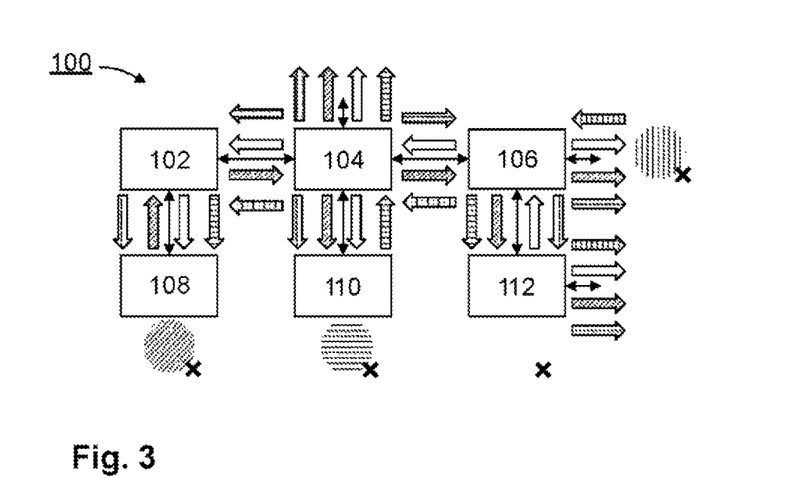
FIG. 3 shows an illustrative block diagram of a network that is synchronized according to a time synchronization standard and implements the method according to an aspect of the invention.

FIG. 3 shows an illustrative block diagram of a network 100 that is synchronized according to the IEEE 802.1AS standard and implements the method according to an aspect of the invention. The controllers and switches of the server ECU correspond to those from FIGS. 1 and 2, and, as in FIG. 1, network device 112 has been defined as the grandmaster clock. Switch 112 sends applicable messages relating to time synchronization to the network, said messages being forwarded by the other network devices after the time information has been corrected in compliance with the standard, indicated by the white-filled arrows. According to an aspect of the invention, however, the network devices are configured to send additional messages relating to time synchronization to the network after the time synchronization has been initialized. Controller 102 and switch 110 and another network device, not shown in the figure, each send additional messages relating to time synchronization containing clock parameters and time information equal or corresponding to those of the grandmaster clock, but with their own unique clock identification. The arrows emanating from the additional grandmaster clocks, which represent messages relating to time synchronization, are shaded differently accordingly. An attacker would see a multiplicity of messages relating to time synchronization that are sent by different controllers or switches but each appear to originate from the grandmaster clock and include the same synchronized time information. This makes it considerably more difficult for the attacker to find out which network device, or which controller, is actually providing the grandmaster clock. The selection of the controllers that send additional messages relating to time synchronization takes into account that the controllers should be as easy to isolate as possible, or be particularly good at fending off attacks.

Figure 4:
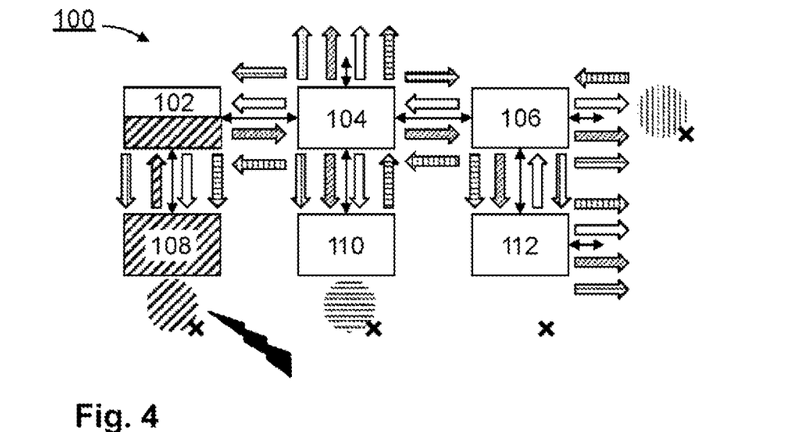
FIG. 4 shows a first representation of the block diagram of the network from FIG. 3 during an attack.
Figure 5:
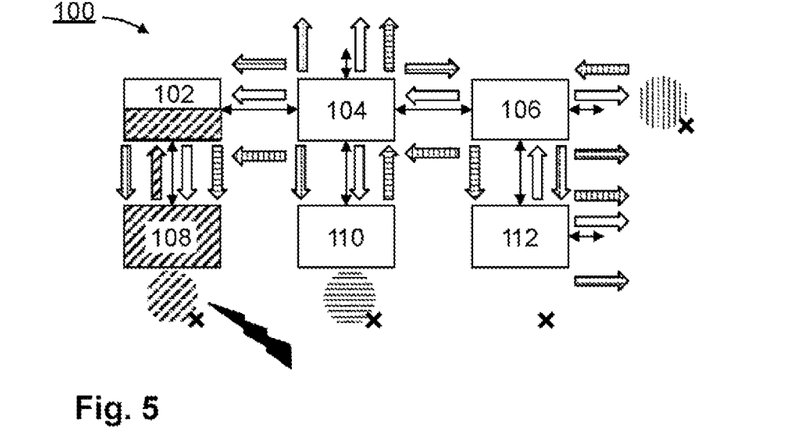
FIG. 5 shows a second representation of the block diagram of the network from FIG. 3 during an attack.

FIG. 4 shows a first representation of the block diagram of the server ECU 100 from FIG. 3 during an attack. The attacker has targeted switch 108 and altered the time information included in the messages relating to time synchronization of this network device, indicated by the bolder diagonal shading of the clock symbol, the box that represents the network device and the arrow pointing away from the network device, which represents the message relating to time synchronization. Controller 102 is still synchronized to the time provided by switch 112 and detects that the message relating to time synchronization that comes from network device 108 includes incorrect time information. Switch is therefore the "shadow controller". By way of example, it can now correct the time information included in the message relating to time synchronization that comes from switch 108 on the basis of its own time, which is synchronized to the "genuine" grandmaster clock, and can send it to the network. This is indicated by the thinner diagonal shading of the arrows. However, as shown in FIG. 5, network device 102 may also ignore messages relating to time synchronization that come from switch 108 and not retransmit them to the network.

Figure 6:
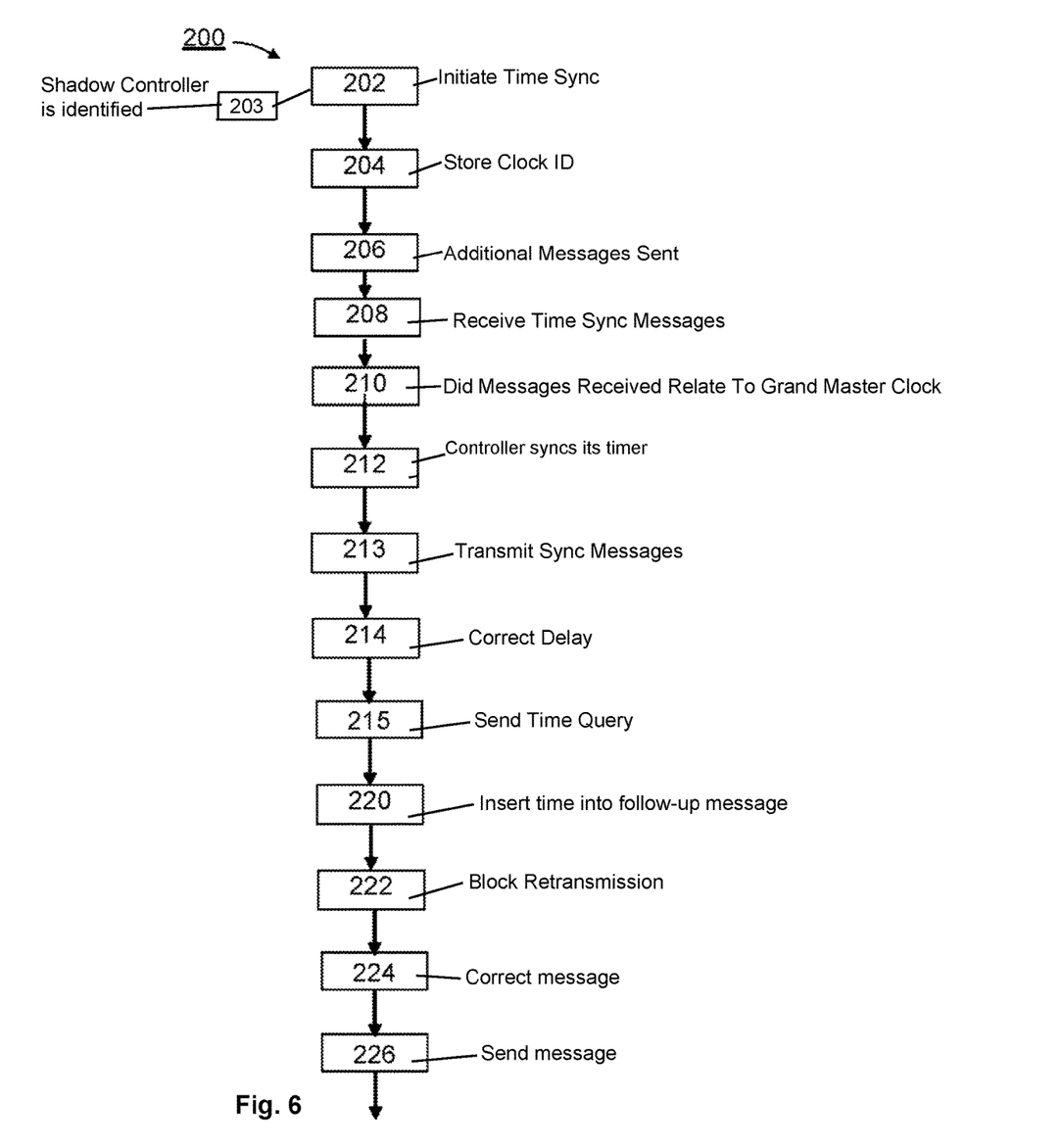
FIG. 6 shows a schematic flowchart for an aspect of the method according to an aspect of the invention.

FIG. 6 shows a schematic flowchart for an aspect of the method 200 according to an aspect of the invention. In step 202, the time synchronization is initialized in a fundamentally known manner, for example performance of the Best Master Clock Algorithm, followed by storage of the unique clock identification of the grandmaster clock determined during the initialization, in step 204. In step 203, a shadow controller is identified. Step 204 can be carried out in each controller of the server ECU. In step 206, according to an aspect of the invention, selected components of the server ECU that do not provide the previously determined grandmaster clock send additional messages relating to time synchronization.

At this point, the method can be continued in different ways. Normally, messages relating to time synchronization from the grandmaster clock determined during the initialization and the additional messages relating to time synchronization that are sent by the selected components in step 206 are received by almost all components in step 208. The controllers and switches that themselves send messages relating to time synchronization logically do not receive their own messages relating to time synchronization. In step 210, each network device checks whether a received message relating to time synchronization originates from the grandmaster clock determined during the initialization, which is designated as switch 108. If so, "yes" branch of step 210, the controller synchronizes its own timer in step 212, having previously corrected the delay on the receive connection in step 214. In step 213, the synchronization messages are transmitted. In step 215, the sending time is queried with the shadow controller (switch), and in step 216 the time is inserted in the follow-up message and the shadow controller, or the switch 102, retransmits.

If further components are directly connected to the controller, the controller sends a message relating to time synchronization containing the time information, possibly corrected for internal delay times in step 214, for step 216, with the set content according to FIG. 8, to neighboring network devices.

In addition, it is also possible for monitoring for difference to be performed in step 220 and for retransmission to be blocked in step 222. Time information can then be corrected in step 224 and the message D can be sent to the other network devices in step 226.

If the message relating to time synchronization does not originate from the grandmaster clock determined during the initialization, the controller corrects the received time information in step 214 for the delay on the receive connection and the known internal delay, and sends a message relating to time synchronization containing the corrected time information to neighboring components in step 216.

In addition, it is possible to check in step 220 whether the time information received in the additional messages relating to time synchronization differs from the time information transmitted in messages relating to time synchronization containing the clock identification of the grandmaster clock determined during the initialization. If this is not the case, then nothing further needs to be done. However, if a difference is detected that cannot be explained by inevitable tolerances during the synchronization, the forwarding of the additional message relating to time synchronization can be blocked in step 222. Alternatively, the differing time information can be corrected in step 224 on the basis of the time information of the internal clock, which is synchronized to the grandmaster clock determined during the initialization with the shadow controller, and then retransmitted in step 216 after the delay times and delays have been corrected. Alternatively or additionally, in step 226, a message can be sent to a previously defined switch or controller of the server ECU that is configured to initiate and/or control protective measures.

Figure 7A:
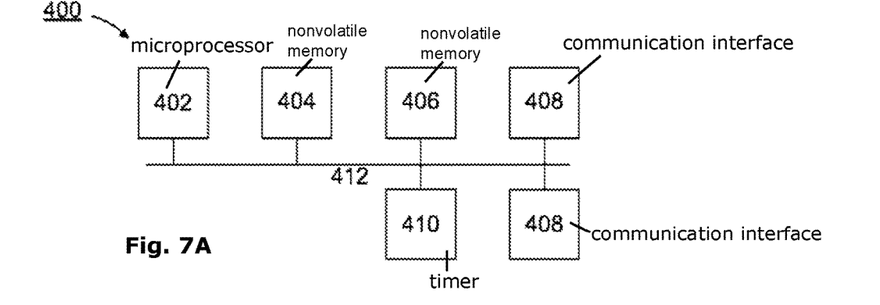
FIG. 7A shows a schematic block diagram of a network device that implements the method.
Figure 7B:
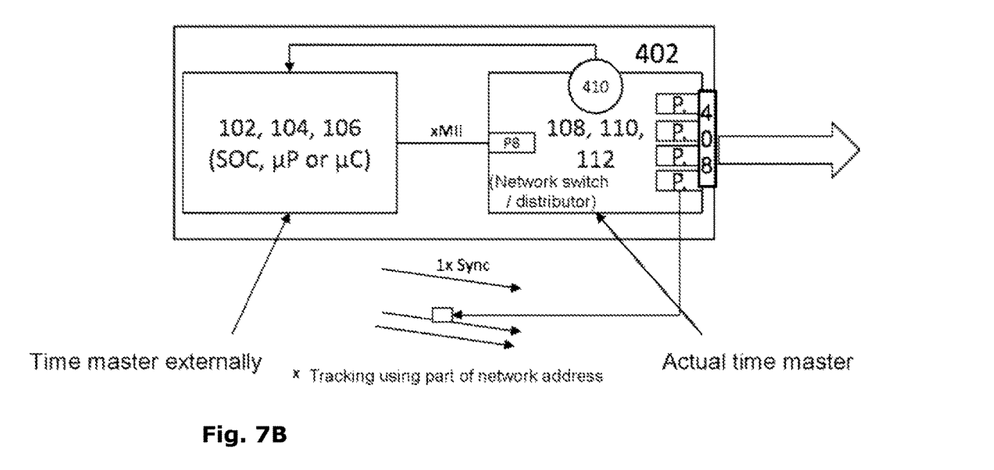
FIG. 7B shows a schematic block diagram of a network device that implements the method, showing the components individually and showing the formation of the time information as a general solution.

FIGS. 7A and 7B show an exemplary block diagram of a network device 400 configured to carry out the method according to an aspect of the invention. In addition to a microprocessor 402, the network device 400 comprises volatile and nonvolatile memory 404, 406, two communication interfaces 408 and a synchronizable timer 410. The elements of the network device are communicatively connected to one another by way of one or more data connections or data buses 412. The nonvolatile memory 406 contains program instructions that, when executed by the microprocessor 402, implement at least one embodiment of the method according to an aspect of the invention.

FIG. 8 depicts how the address of the grandmaster is formed with the synchronization messages and what information is included therein. In addition, in the event of an attack, the identification of the shadow controller (108, 110, 112) allows a communication to be conveyed to the other controllers (102, 104, 106). This allows detection of whether the grandmaster is under attack. If this is the case, the controller is changed while retaining the shadow controller. The network and sensors have no restrictions despite the attack, and no time jumps occur.

LIST OF REFERENCE SIGNS 100 vehicle network
102 SOC, µP or µC
104 SOC, µP or µC
106 SOC, µP or µC
108 switch
110 switch
112 switch
200 method
202 initialize
203 identify a shadow controller
204 store
206 send
208 receive
210 check clock identification
212 start time synchronization
213 transmit synchronization messages
214 correct time
215 query sending time with the shadow controller (switch)
216 insert time in follow-up message and retransmit
220 monitor for difference
222 block retransmission
224 correct time information
226 send message
400 network device
402 microprocessor
404 RAM
406 ROM
408 communication interface
410 timer/clock
412 bus
500 Ethernet header
510 PTP message
511 grandmaster's address
512 timestamp
520 FCS

The invention claimed is:

1. A method for securing time synchronization in a server electronic control unit (ECU), in which a time synchronization takes place according to a time synchronization standard, comprising:
   initializing the time synchronization of components of the server ECU;
   storing a unique clock identification of a grandmaster clock determined during the initialization in each of the components of the server ECU that does not provide a previously determined grandmaster clock;
   identifying a shadow controller selected from the components of the server ECU;
   transmitting synchronization messages;
   querying a sending time with the shadow controller;
   inserting a time in a follow-up message by way of the shadow controller that forms the grandmaster clock, and retransmitting the time; and
   sending additional messages relating to time synchronization by way of selected network devices that do not provide the previously determined grandmaster clock,
   wherein information sent in the additional messages relating to time synchronization and also to clock parameters relevant for determining a best clock by a Best Master Clock Algorithm (BMCA) and a domain number match those of the previously determined grandmaster clock, or are comparable with them, and
   wherein the additional messages relating to time synchronization contain a unique clock identification corresponding to the identification of a respective selected network device.

2. The method as claimed in claim 1, also comprising, in network devices that do not provide the grandmaster clock determined during the initialization:
   receiving a message relating to time synchronization on a first network interface; and
   checking whether the clock identification transmitted in the message relating to time synchronization matches the stored clock identification of the grandmaster clock determined during the initialization and, if this is the case, correcting the time information received in the message relating to time synchronization in accordance with delay times determined according to IEEE 802.1AS and synchronizing a local clock by using the time information received in the message relating to time synchronization.

3. The method as claimed in claim 2, additionally comprising, if the network device has two or more interfaces to which further network devices are connected:
- correcting the time information received in the message relating to time synchronization in accordance with at least one of the delay times and device-internal delays determined according to IEEE 802.1AS; and
- sending an accordingly corrected message relating to time synchronization via one or more second network interfaces.

4. The method as claimed in claim 1, additionally comprising:
- receiving messages relating to time synchronization on a first network interface;
- monitoring the time information transmitted in additional messages relating to time synchronization for a difference in relation to time information transmitted in messages relating to time synchronization containing the clock identification of the grandmaster clock determined during the initialization; and
- blocking the additional messages relating to time synchronization containing the clock identification of the network device for which a difference has been detected; or
- at least one of correcting the differing time information on the basis of time information received from the grandmaster clock determined during the initialization before forwarding; and sending a message to a previously defined network device of the network that is configured to at least one of initiate and control protective measures.

5. The method as claimed in claim 1, wherein the grandmaster clock determined during the initialization sporadically or cyclically sends messages relating to time synchronization in which the time information differs from the actual time, and wherein the network device providing the grandmaster clock determined during the initialization monitors additional messages relating to time synchronization that are sent by the other network devices for whether the additional messages relating to time synchronization reflect the differences in the time information accordingly and wherein, if not, the network device providing the grandmaster clock determined during the initialization sends a corresponding message to a previously defined network device of the network that is configured to at least one of initiate and control protective measures.

6. A network device comprising a microprocessor, volatile and nonvolatile memory, a synchronizable timer and at least one communication interface, which are communicatively connected to one another by way of one or more data lines or data buses, wherein the network device is configured to perform the method as claimed in claim 1.

7. A vehicle having a network comprising multiple network devices as claimed in claim 6.

8. A non-transitory computer program product comprising instructions that, when the program is executed by a computer, cause said computer to perform the method as claimed in claim 1.

9. A non-transitory computer-readable medium on which the computer program product as claimed in claim 8 is stored.

\* \* \* \* \*